(12) United States Patent
Loeb et al.

(10) Patent No.: US 11,535,521 B2
(45) Date of Patent: Dec. 27, 2022

(54) LARGE SCALE SYNTHESIS OF RESORCINOL-FORMALDEHYDE AEROGEL

(71) Applicant: Lawrence Livermore National Security, LLC, Livermore, CA (US)

(72) Inventors: Colin Loeb, Fairfield, CA (US); Patrick Campbell, Oakland, CA (US); Jennifer Marie Knipe, Oakland, CA (US); Michael Stadermann, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 418 days.

(21) Appl. No.: 16/784,385

(22) Filed: Feb. 7, 2020

(65) Prior Publication Data
US 2021/0246032 A1 Aug. 12, 2021

(51) Int. Cl.
*C08J 9/28* (2006.01)
*C01B 32/318* (2017.01)
(Continued)

(52) U.S. Cl.
CPC .......... *C01B 32/318* (2017.08); *C01B 32/336* (2017.08); *C08G 8/22* (2013.01); *C08J 9/286* (2013.01); *C08J 9/36* (2013.01); *B29C 39/003* (2013.01); *B29K 2061/04* (2013.01); *B29K 2105/0061* (2013.01); *C08G 2110/0091* (2021.01); *C08J 2201/0502* (2013.01);
(Continued)

(58) Field of Classification Search
CPC ....... C01B 32/318; C01B 32/336; C08G 8/22; C08G 2110/0091; C08J 9/286; C08J 9/36; C08J 2201/0502; C08J 2205/026; C08J 2205/042; C08J 2205/044; C08J 2201/0504; C08J 2361/10; B29C 39/003; B29C 39/02; B29C 39/26; B29K 2061/04; B29K 2105/0061; B29K 2105/04; C04B 38/0032; C04B 2111/28; C04B 2111/52
See application file for complete search history.

(56) References Cited

U.S. PATENT DOCUMENTS

| | | | |
|---|---|---|---|
| 4,873,218 | A | 10/1989 | Pekala |
| 4,997,804 | A | 3/1991 | Pekala |

(Continued)

FOREIGN PATENT DOCUMENTS

| | | | | |
|---|---|---|---|---|
| CN | 1281484 C | * | 10/2006 | |
| WO | WO-9306044 A1 | * | 4/1993 | ......... C01B 33/1585 |

OTHER PUBLICATIONS

18. Mirzaeian et al., "The control of porosity at nano scale in resorcinol formaldehyde carbon aerogels," Journal of Material Science, (2009) 44:2705-2713. (Year: 2009).*

(Continued)

*Primary Examiner* — Kara B Boyle
(74) *Attorney, Agent, or Firm* — Zilka-Kotab, P.C.

(57) ABSTRACT

A product includes an aerogel having a single bulk structure, the single bulk structure having at least one dimension greater than 10 millimeters. The single bulk structure includes a plurality of pores, where each pore has a largest diameter defined as a greatest distance between pore walls of the respective pore. In addition, an average of the largest diameters of a majority of the pores is within a specified range, and the plurality of pores are distributed substantially homogenously throughout the single bulk structure.

15 Claims, 7 Drawing Sheets

(51) Int. Cl.
*C08G 8/22* (2006.01)
*C08J 9/36* (2006.01)
*C01B 32/336* (2017.01)
*B29K 61/04* (2006.01)
*B29C 39/00* (2006.01)
*B29K 105/00* (2006.01)

(52) U.S. Cl.
CPC .... *C08J 2205/026* (2013.01); *C08J 2205/042* (2013.01); *C08J 2205/044* (2013.01)

(56) References Cited

U.S. PATENT DOCUMENTS

| | | | |
|---|---|---|---|
| 7,410,718 B2* | 8/2008 | Cooper | H01M 4/96 429/532 |
| 8,304,465 B2 | 11/2012 | Coronado et al. | |
| 2017/0291980 A1* | 10/2017 | Cain | C08G 8/22 |

OTHER PUBLICATIONS

Muhtaseb et al., "Preparation and Properties of Resorcinol-Formaldehyde Organic and Carbon Gels," Advanced Materials, 2003, 15, No. 2, Wiley, 101-114. (Year: 2003).*

Pekala et al., "A Synthetic Route to Organic Aerogels—Mechanisim, Structure and Properties," Revue De Physique Appliquee, vol. 24, No. 4, Apr. 1989, pp. C4-33-C4-40.

Fischer et al., "Carbon Aerogels as Electrode Material in Supercapacitors," Journal of Porous Materials, vol. 4, 1997, pp. 50-54.

Brandt et al., "Acetic Acid Catalyzed Carbon Aerogels," Journal of Pourous Materials, vol. 10, 2003, pp. 172-178.

Job et al., "Synthesis optimization of organic xerogels produced from convection air-drying of resorcinol-formaldehyde gels," Journal of Non-Crystalline Solids, vol. 352, 2006, pp. 24-34.

Baumann et al., "High surface area carbon aerogel monoliths with hierarchical porosity," Journal of Non-Crystalline Solids, vol. 354, Apr. 12, 2008, pp. 3513-3515.

* cited by examiner

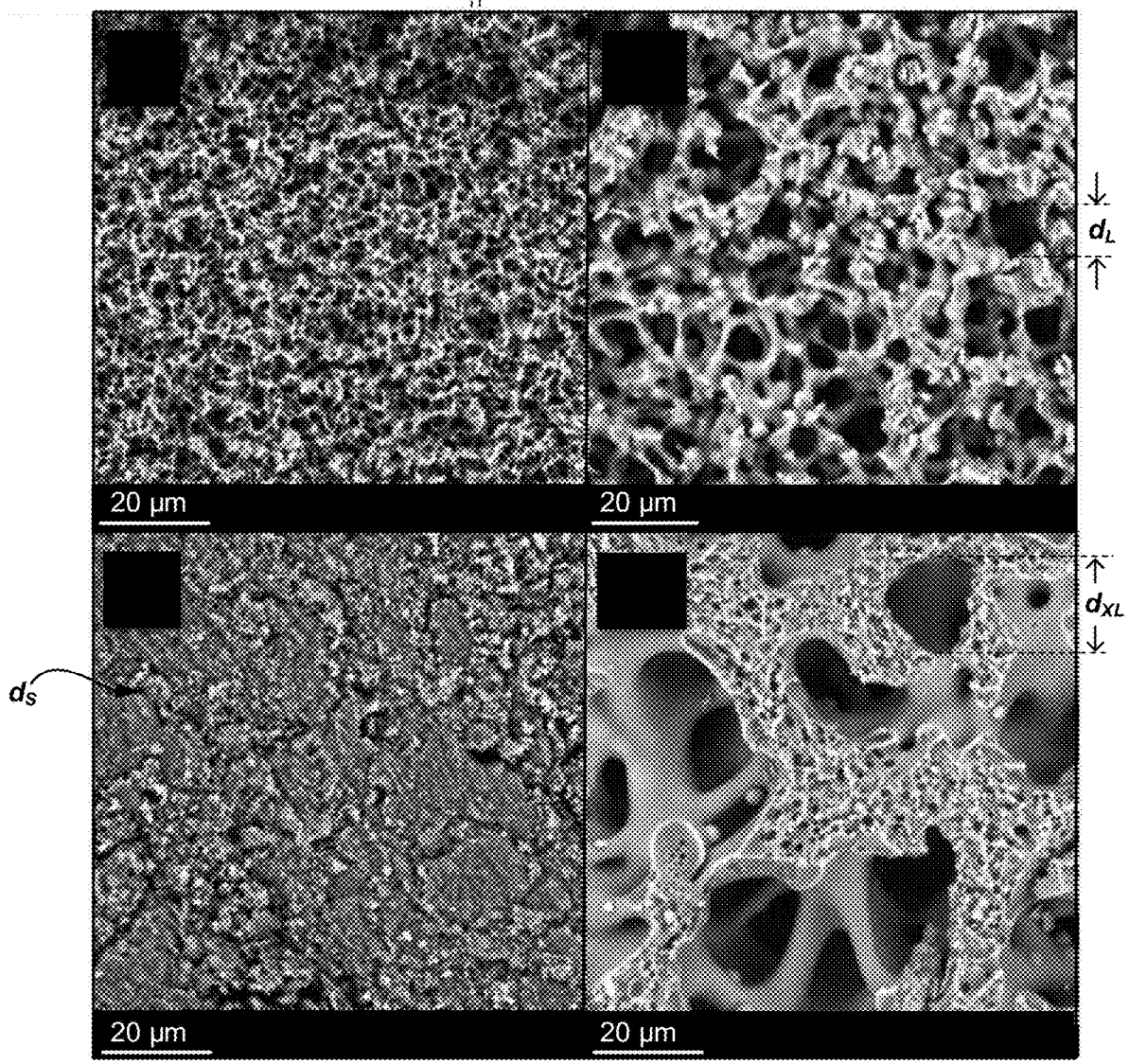

LARGE SCALE SYNTHESIS OF RESORCINOL-FORMALDEHYDE AEROGEL

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to manufacturing, and more particularly, this invention relates to large scale production of resorcinol-formaldehyde aerogels.

BACKGROUND

Aerogels are a low density, porous, and high surface area class of material. A resorcinol-formaldehyde aerogel, first synthesized in the late 1980's, is produced using a sol-gel synthesis from an aqueous resorcinol formaldehyde (RF) solution. Under basic or acidic conditions, the resorcinol and formaldehyde components of an RF solution cross-link to form a macro/micro-porous gel with pores having water contained therein. The RF macro/micro-porous gels are typically dried by solvent exchange and critical point extraction to produce an organic aerogel. In some instances, the dried organic aerogel may be carbonized at high temperature under an inert atmosphere to produce pure carbon aerogels.

Numerous studies have demonstrated synthesis parameters and processing conditions to tailor the properties of the organic aerogel. These studies have explored various catalyst, ingredient ratios and sol-gel thermal conditions, however all these studies have been completed on a small scale, having a volume of RF solution typically less than 100 milliliters (mL).

Attempts to scale up synthesis of organic aerogels has proven to be challenging. At starting volumes greater than 100 mL, the formation of the RF macro/microporous gels tends to result in the formation of an aerogel having uneven, striped, non-homogenous material. Thus, fabrication of bulk aerogels having a dimension larger than 2 inches tends to rely on fusing together aerogel material formed from less than 100 mL starting volume. Consequently, the industry of aerogels has deemed RF aerogel synthesis on the large scale to not be cost effective. Methods for large scale synthesis of organic aerogels derived from RF solution remain elusive.

SUMMARY

In one embodiment, a product includes an aerogel having a single bulk structure, the single bulk structure having at least one dimension greater than 10 millimeters. The single bulk structure includes a plurality of pores, where each pore has a largest diameter defined as a greatest distance between pore walls of the respective pore. In addition, an average of the largest diameters of a majority of the pores is within a specified range, and the plurality of pores are distributed substantially homogenously throughout the single bulk structure.

In another embodiment, a method of forming a single bulk aerogel having a linear dimension greater than 10 millimeters and having a homogenous distribution of pores throughout includes mixing a solution comprising resorcinol and formaldehyde, where the solution has a volume greater than 100 milliliters. In addition, the method includes heating the solution to a first temperature for a first defined duration of time, cooling the solution to a second temperature lower than the first temperature, and curing the solution for gelation of the solution. The curing occurs at about the second temperature for a second defined duration of time.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 7A is a scanning electron microscopy image of a carbonized RF aerogel having a majority of medium-size pores, according to one embodiment.

FIG. 7B is a scanning electron microscopy image of a carbonized RF aerogel having a majority of large-size pores, according to one embodiment.

FIG. 7C is a scanning electron microscopy image of a carbonized RF aerogel having a majority of small-size pores, according to one embodiment.

FIG. 7D is a scanning electron microscopy image of a carbonized RF aerogel having a majority of extra-large-size pores, according to one embodiment.

DETAILED DESCRIPTION

Figure 1:
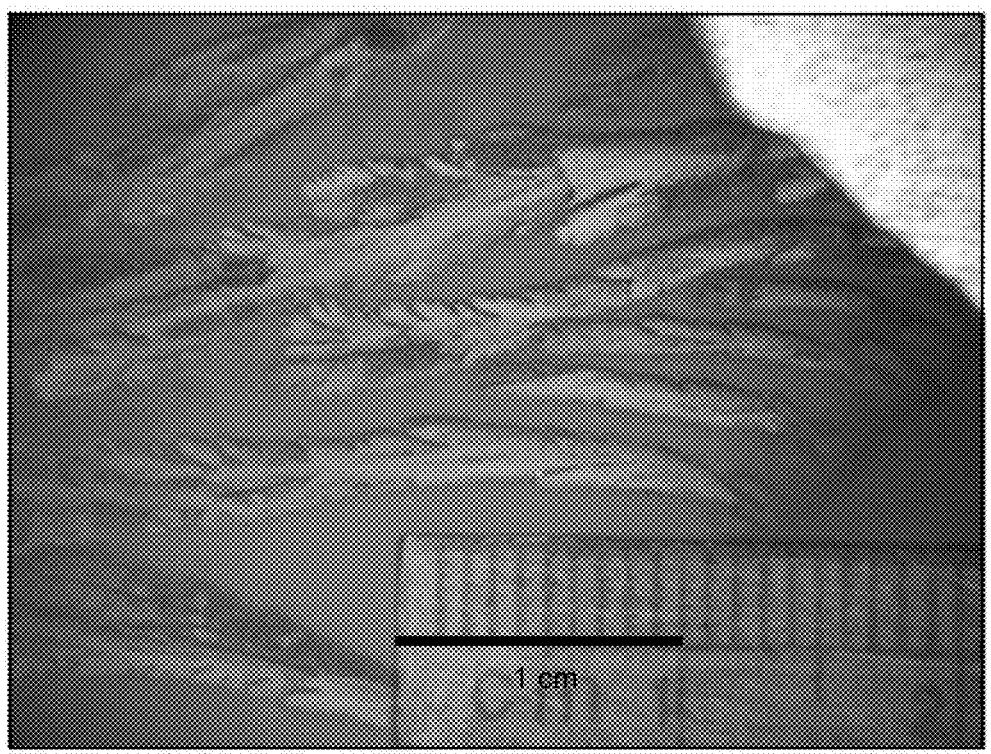
FIG. 1 is an image of material formed by conventional methods, including striping of an un-pre-cured RF sheet.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

For the purposes of this application, room temperature is defined as in a range of about 20° C. to about 25° C.

As also used herein, the term "about" denotes an interval of accuracy that, ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt % is defined as the percentage of weight of a particular component is to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the structure, and/or final product in which the component is present, and preferably results in a change of the characteristic to within a desired range. One skilled in the art, now armed with the teachings herein, would be able to readily determine an effective amount of a particular component without having to resort to undue experimentation.

The following description discloses several preferred embodiments of large scale synthesis of resorcinol-formaldehyde aerogels and/or related systems and methods.

In one general embodiment, a product includes an aerogel having a single bulk structure, the single bulk structure having at least one dimension greater than 10 millimeters. The single bulk structure includes a plurality of pores, where each pore has a largest diameter defined as a greatest distance between pore walls of the respective pore. In addition, an average of the largest diameters of a majority of the pores is within a specified range, and the plurality of pores are distributed substantially homogenously throughout the single bulk structure.

In another general embodiment, a method of forming a single bulk aerogel having a largest dimension greater than 10 millimeters and having a homogenous distribution of pores throughout includes mixing a solution comprising a resorcinol and formaldehyde, where the solution has a volume greater than 100 milliliters. In addition, the method includes heating the solution to a first temperature for a first defined duration of time, cooling the solution to a second temperature lower than the first temperature, and curing the solution for gelation of the solution. The curing occurs at about the second temperature for a second defined duration of time.

A list of acronyms used in the description is provided below.
3D three-dimensional
C Celsius
cm centimeter
$CO_2$ carbon dioxide
CTAB Cetyltrimethylammonium bromide
DI deionized
hr hour
$MgCl_2$ magnesium chloride
L liter
mL milliliters
min minutes
mm millimeter
ms millisecond
nm nanometer
NaCl Sodium chloride
$N_2$ nitrogen gas
RF resorcinol formaldehyde
SDS Sodium dodecyl sulphate
μM micron
wt % weight percent According to one embodiment, a method for manufacturing homogeneous resorcinol-formaldehyde (RF) aerogel at a commercially viable scale is described. In some approaches, methods include synthesis parameters and treatments necessary for industrial production of RF aerogel with a homogeneous microstructure, where the microstructure is defined by the pore structure throughout the aerogel. In one approach, a thermal pre-cure of the precursor solution followed by gelation at ambient temperatures has been shown to be critical for the homogeneity of the RF aerogel regarding its bulk and macroporosity, respectively. In some approaches, unique drying, carbonization, and activation conditions are critical to produce uniformly activated carbon aerogel for applications in electron transfer devices, adsorbents, foams, etc.

Conventional approaches have included increasing the volumes of the conventional RF solution followed by gelation without a precuring step. Conventional methods of forming an aerogel include using a thin sheet casting method in which gelation of the RF solution occurs between glass panes with a desired spacer up to 1 millimeter (mm). As shown in FIG. 1, the conventional method using greater than 100 mL of RF solution produces aerogel sheets with macro scale pin-holes and striping. The non-homogeneity of the aerogel sheets results in a random variation in density of the structures, thereby rendering the aerogel sheets inefficient and unusable for many applications.

Pre-curing the RF solution before casting may be one of the most critical points of the described embodiments for producing a defined and homogenous array of microstructures in an aerogel formed from a large scale synthesis process.

FIGS. 2A-2D depict schematic diagrams of a perspective view of a product 200, 210, 220, 230, in accordance with one aspect of an inventive concept. As an option, the present product 200, 210, 220, 230 may be implemented in conjunction with features from any other inventive concept listed herein, such as those described with reference to the other FIGS. Of course, however, such product 200, 210, 220, 230 and others presented herein may be used in various applications and/or in permutations which may or may not be specifically described in the illustrative embodiments listed herein. Further, the product 200, 210, 220, 230 presented herein may be used in any desired environment.

According to one inventive concept, an aerogel includes a single bulk structure having at least one linear dimension greater than 10 mm. The single bulk structure includes a plurality of pores, where the average of the largest diameters of the majority of the pores is within a specified range, e.g., a predefined range, engineered range, etc. Moreover, the plurality of pores may be distributed substantially homogenously throughout the single bulk structure.

In one embodiment, a product includes an aerogel having a single bulk structure where the bulk structure has at least one dimension greater than 10 mm. In one approach, the bulk structure has at least one dimension greater than 20 mm. In various approaches, the bulk structure is derived from a single form (e.g., template, mold, etc.). In other words, the bulk structure is not a composite of several forms. In one approach, the single bulk structure includes a plurality of pores, where each pore has a largest diameter defined as a greatest distance between pore walls of the respective pore. The average of the largest diameters of a majority of the pores is within a specified range that may be predefined prior to formation of the bulk structure. Moreover, the plurality of pores may be distributed substantially homogenously throughout the single bulk structure.

Figure 2A:
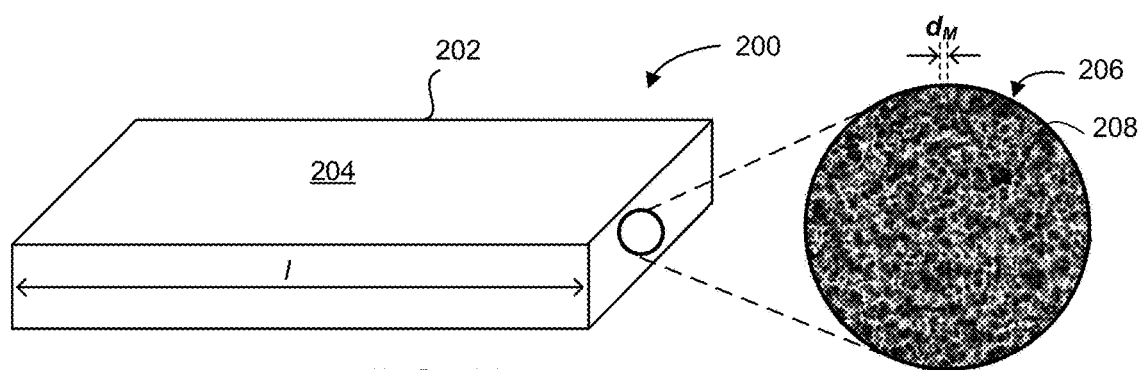
FIG. 2A is a schematic drawing of a perspective view of an optically homogenous RF aerogel block, according to one embodiment.

Looking to FIG. 2A, a product 200 includes an aerogel 202 having a single bulk structure 204 having at least one linear dimension l greater than 10 mm. In one approach, the aerogel 202 may have at least one linear dimension greater than 50 mm. The single bulk structure 204 of the aerogel 202 includes a homogenous resorcinol formaldehyde (RF) material having a homogenous distribution of a plurality of pores. As shown in the magnified view 206 of a portion of the bulk structure 204 of the aerogel 202, the pores 208 may have a substantially uniform size distributed homogenously throughout the bulk structure 204. In one approach, an average of the largest diameters $d_M$ of the majority of the medium-sized pores may be in a specified range of about than 500 nanometers (nm) to about 2000 nm.

Figure 2B:
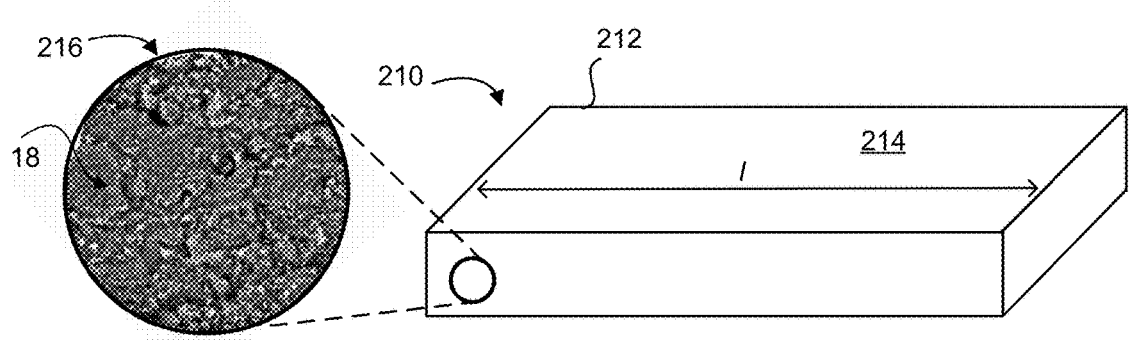
FIG. 2B is a schematic drawing of a perspective view of an optically homogenous RF aerogel block having small pores, according to one embodiment.
Figure 2C:
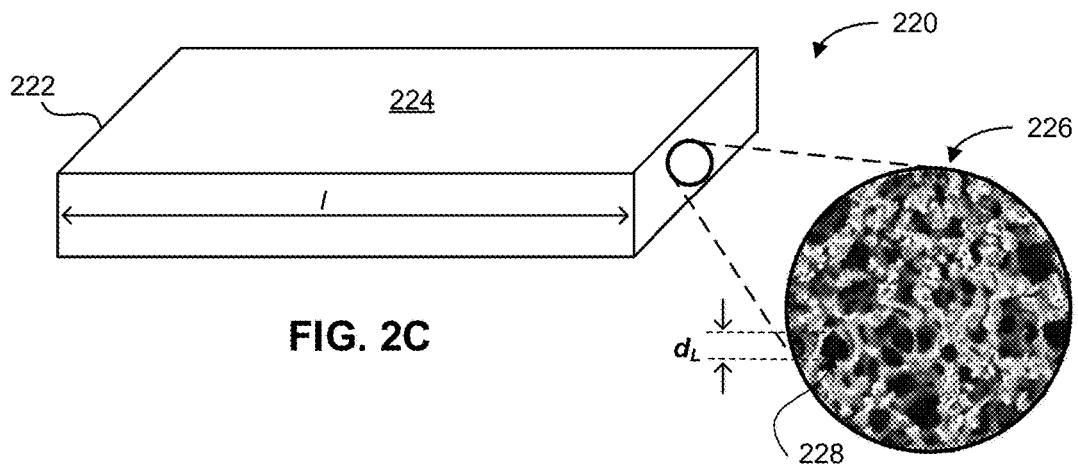
FIG. 2C is a schematic drawing of a perspective view of an optically homogenous RF aerogel block having large pores, according to one embodiment.
Figure 2D:
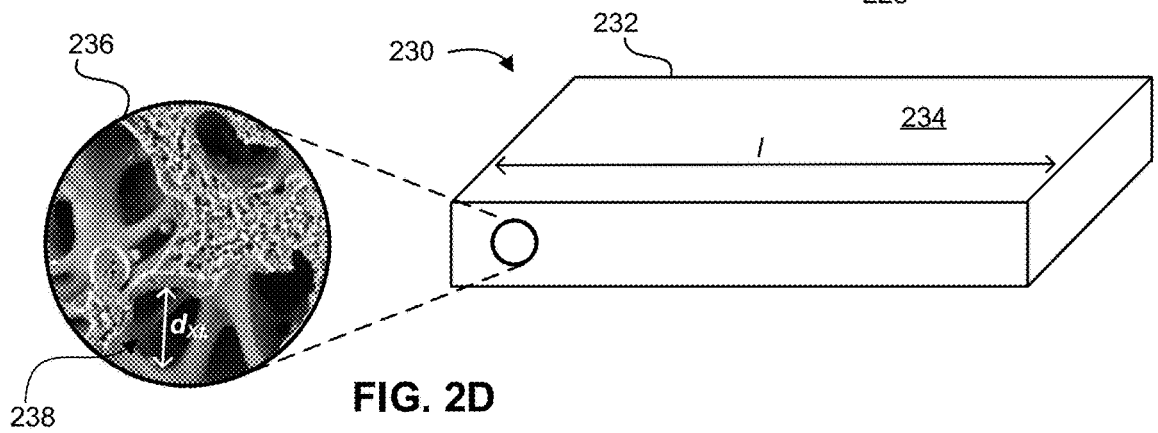
FIG. 2D is a schematic drawing of a perspective view of an optically homogenous RF aerogel block having extra-large pores, according to one embodiment.

In various approaches, the RF mixture for forming the aerogel may include an additive that may predefine a size of the plurality of pores in the material of the aerogel after curing and carbonization. In one approach, as shown in FIG. 2A, an aerogel 202 may be formed without an additive. In another approach, an aerogel may be formed with an additive such as a surfactant. As shown in FIG. 2B, adding a surfactant to the RF mixture for forming an aerogel may produce an aerogel having a homogenous distribution of small pores. In yet another approach, an aerogel may be formed with an additive such as a salt. As shown in FIG. 2C, adding a salt to the RF mixture for forming the aerogel may produce an aerogel having a homogenous distribution of larger pores. In yet another approach, an aerogel may be formed with an additive such as a salt at an elevated temperature. As shown in FIG. 2D, adding salt to the RF mixture for forming the aerogel with an elevated temperature during gelation may produce an aerogel having a homogenous distribution of extra-large pores.

Looking to FIG. 2B a schematic drawing is depicted of a perspective view of a product 210 of an aerogel 212 having a single bulk structure 214 with at least one linear dimension l greater than 10 mm. As shown in the magnified view 216 of a portion of the bulk structure 214 of the aerogel 212, an average of the largest diameters of the majority of the small pores 218 of the bulk structure 214 may be in a specified range of greater than 0 nm to less than 500 nm. In one approach, the average of the largest diameters of the majority of pores may be in a range of greater than 50 nm to less than 500 nm. In one approach, the formulation of the RF solution to form the material of the aerogel may include a surfactant to produce small homogenous pores 218 throughout the bulk structure 214 of the aerogel 212. In addition, the majority of the pores 218 may be notably smaller than the majority of the pores 208 from the aerogel 202 formed without an additive, e.g., a surfactant (as shown in FIG. 2A).

Turning to FIG. 2C, a schematic drawing is depicted of a perspective view of a product 220 including an aerogel 222 having a single bulk structure 224 with at least one linear dimension l greater than 10 mm. As shown in the magnified view 226 of a portion of the bulk structure 224 of the aerogel 222, an average of the largest diameters $d_L$ of the majority of the large pores 228 of the material may be in specified range of about 2 microns (μm) to about 10 μm. In addition, the majority of the pores 228 may be notably larger than the majority of the pores 208 from the aerogel 202 formed without a salt (as shown in FIG. 2A) as well as much larger than the majority of pores 218 from the aerogel 212 formed with a surfactant (as shown in FIG. 2B).

FIG. 2D depicts a schematic drawing of a perspective view of a product 230 of an aerogel 232 having a single bulk structure 234 with at least one linear dimension l greater than 10 mm. As shown in the magnified view 236 of the bulk structure 234 of the aerogel 232, an average of the largest diameters $d_{XL}$ of the majority of the extra-large pores 238 of the bulk structure 234 may be in greater than about 10 μm. In one approach, the average of the largest diameters $d_{XL}$ of the majority of the extra-large pores may be in a range of greater than 10 μm to less than 30 μm. In one approach, the majority of the pores 238 in the magnified view 236 may be notably larger than the majority of the pores 228 from the aerogel 222 formed with salt but without an elevated temperature during gelation (as shown in FIG. 2C).

The approaches illustrated in FIGS. 2A-2D are by way of example only and are not meant to be limiting in any way. The dimensions of the aerogels may be larger or smaller. The average of the largest diameters of the pores distributed homogenously throughout the aerogel may be larger or smaller than described herein.

Figure 3:
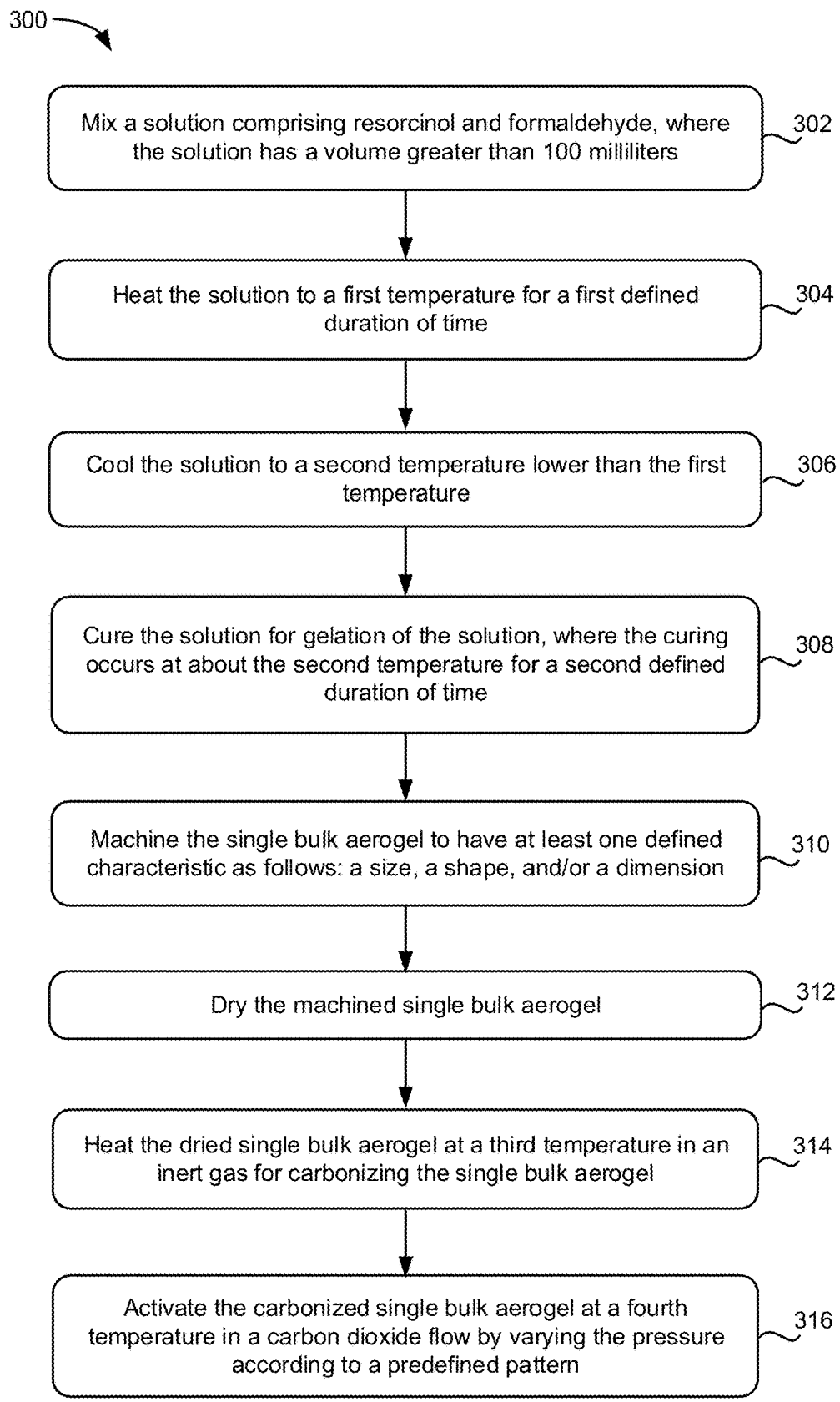
FIG. 3 is a flow chart of a method for forming a homogenous RF aerogel, according to one embodiment.

FIG. 3 shows a method 300 for forming a RF aerogel using a large scale synthesis method, in accordance with one aspect of one inventive concept. As an option, the present method 300 may be implemented to construct structures such as those shown in the other FIGS. described herein. Of course, however, this method 300 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 3 may be included in method 300, according to various embodiments. It should also be noted that any of the aforementioned features may be used in any of the embodiments described in accordance with the various methods.

In various approaches, the process of large-scale formation of RF aerogels provides homogeneity throughout the material on three levels: the first level is an optical homogeneity, the second level is a homogeneity of macropore morphology, and the third level is a homogeneity of micro- and mesopores. The first level of optical homogeneity may be described as the material having a homogeneity across millimeters of material. For example, the material is absent of bubbles, striping, etc. along millimeter lengths of the structure. The first level homogeneity of the aerogel material may be achieved with pre-cure conditions and gelation temperature that allows significant homogeneity of the material at large bulk sizes, e.g., having a linear dimension l of greater than 10 mm.

The second level of homogeneity may be described as the macropore morphology of the material having homogeneity on the scale of many microns in size down to hundreds of nanometers. Homogeneity of the macropore morphology may be achieved through an ambient temperature cure.

The third level of homogeneity may be described as having homogeneity of the micro- and meso-pores, on the scale of a 50 nm and smaller. The homogeneity of the micro- and mesopores pores may be formed during the activation process where a few atoms of the structure are chemically etched away. The third level of homogeneity may be achieved with baffles, gas flow, and pressure cycling as described herein.

In one approach, as shown in FIG. 3, method 300 describes a process of forming a single bulk aerogel having a linear dimension l greater than 10 mm and having a homogenous distribution of pores throughout. In one approach, the process may form a single bulk aerogel having a linear dimension l greater than 50 mm. Method 300 may begin with step 302 of mixing a solution including resorcinol and formaldehyde, where the solution has a volume greater than 100 milliliters (mL). In one approach, the solution may have a volume greater than 500 mL. In one approach, the solution may have a volume greater than 1 liter (L). In one approach, the solution may have a volume greater than 1.5 L. In some approaches, the solution may have a volume greater than 2 L, 2.5 L, 3 L, 3.5 L, 4 L, 4.5 L, etc. In one approach, the mixed solution may include a catalyst. In some approaches a catalyst may include an acid, a base, etc. In another approach, the mixed solution does not include a catalyst.

According to one embodiment, a method is described in which homogeneous RF aerogel may be produced at a scale larger than 1 liter (L). In one approach of large scale synthesis, allowing the RF solution to pre-cure is critical for processing bulk RF aerogel. In one approach of large-scale synthesis of bulk RF aerogel, curing the RF gel at ambient temperature, e.g., room temperature, may be critical for processing a homogenous bulk RF aerogel.

Step 304 of method 300 includes heating the solution to a first temperature for a first defined duration of time. In some approaches, the heating of step 304 is a pre-cure of the resorcinol formaldehyde (RF) solution. In one approach, the first temperature may be in a range of about 40° C. to about 60° C. In some approaches, the pre-cure step may include heating the RF solution to a temperature in a range of about 30° C. to about 45° C. for greater than 4 hours, depending on the initial starting volume of the RF solution. In one approach, an RF solution having a volume greater than 100 mL may be precured prior to gelation.

In one approach, the first defined duration of time may be in a range of greater than 30 minutes (min) to about 6 hours (hr). In some approaches, the duration of time during the pre-cure heating may depend on the temperature of the pre-cure step. For example, and not meant to be limiting, a higher temperature may have a shorter duration of time of pre-curing the RF solution.

In some approaches, a minimum time needed for the pre-cure step may depend on the solution becoming heated homogenously throughout. In one approach, a heating apparatus may be employed for improving efficiency of the heating during the pre-cure step. For example, a heating apparatus such as an immersion heater, jacketed reactor, etc. may be employed to increase the rate of temperature increase in the solution to the desired pre-cure temperature. In larger volumes, for example at least 4 L of resorcinol formaldehyde formulation solution, a minimum time of pre-cure may include at least one hour of pre-cure.

Step 306 of method 300 includes cooling the solution to a second temperature lower than the first temperature. In one approach, step 306 includes cooling the solution to near or at room temperature (e.g., 22° to 25° C.). In one approach, the solution may be cooled to an ambient temperature.

Step 308 includes a curing step that may provide the second level of homogeneity of the material as demonstrated by homogeneity of the macropore morphology. Step 308 includes curing the solution for gelation of the solution, where the curing occurs at about the second temperature for a second defined duration of time. In one approach, the curing occurs near or at room temperature (e.g., ambient temperature). In various approaches, the second defined duration of time may be in a range of 24 hours to about 5 days. In one approach, a thermal treatment, pre-cure treatment, etc. (step 306) in combination with a gelation at an ambient temperature (step 308) may be critical for the homogeneity of resulting material.

Gelation of the RF solution at an ambient temperature, a preferred approach of step 308, may allow homogeneity of the macropore morphology of the material in terms of pores having an average of the largest diameters in a range of hundreds of nanometers to greater than tens of microns.

Step 308 may include casting the solution into a pre-form having at least one linear dimension l greater than 10 mm. In one approach, the pre-form may be a mold. In another approach, the pre-form may be a template. In one approach, the pre-cured solution may be cast in a mold having at least one dimension greater than 100 mm (i.e. about 4 inches). In one approach, the pre-cured solution may be cast in a mold having at least one dimension greater than 300 mm (i.e., about 12 inches or 30 centimeters (cm)). For example, and not meant to be limiting, a brick of aerogel may be formed in a mold having dimensions of 20 cm×30.5 cm×10 cm (w×l×h).

The aerogel sheets formed following pre-cure and gelation may be largely devoid of pin-holes and may exhibit a more homogenous structure.

In various approaches, block fabrication of RF aerogels for larger volumes of RF solution may provide advantages over conventional methods including cast sheet fabrication. Moreover, as described herein, pre-cure and gelation temperature profile for block fabrication may play a magnified role compared to cast sheet fabrication. Block fabrication is a process in which RF solution is cast in a mold of desired dimensions, and the molded material is then machined to precise size and shape after gelation.

Figures 5A, 5B:
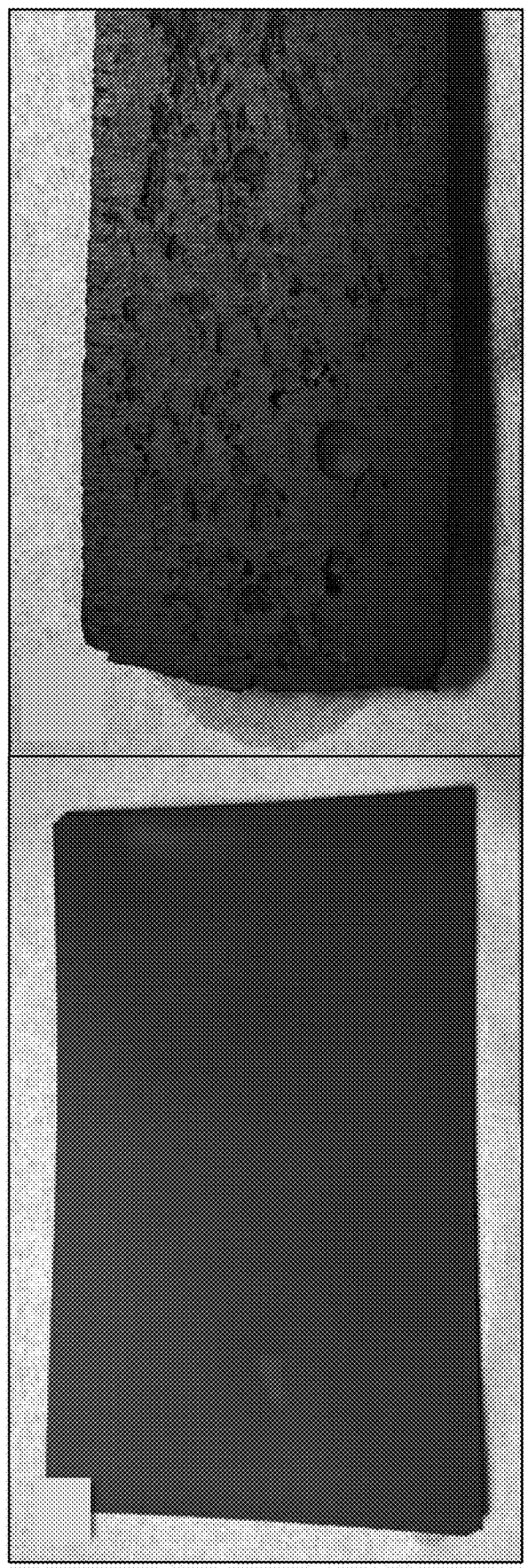
FIG. 5A is an image of an optically homogenous RF aerogel block, according to one embodiment.
FIG. 5B is an image of an optically non-homogenous RF aerogel block using conventional methods.

Similar to thin sheet fabrication (see FIG. 1), an RF block fabricated with large volume RF solution following conventional conditions, e.g., no pre-cure step and curing at 70° C., is shown in the image of FIG. 5B. The RF block fabricated using conventional methods has pinholes and striping as seen in a cast sheet formed under similar conditions as shown in FIG. 1. Further, the optically porous structure formed using conventional methods may be similar to a household sponge (FIG. 5B).

In sharp contrast, an RF block fabricated from an identical RF solution, following a method 300 (see FIG. 3) including a pre-cure treatment as described for step 304 followed by a curing treatment at room temperature as described in step 308 is shown in the image of FIG. 5A.

In various approaches, the duration of the pre-cure time may be adjusted for increased synthesis scale. For example, and not meant to be limiting in any way, a 3 L synthesis may include pre-cure conditions of a minimum of 1 hour at 50° C. to produce a similar homogeneous material. In one approach, the method includes setting the structure during gelation, then the post-bake step develops crosslinking within the structure to reach full material strength. In various approaches, the conditions of pre-cure and gelation at an ambient temperature may result in a homogeneous structure and minimal visuals defects on the surface.

In some approaches, the initial steps of large scale synthesis include a pre-cure step and a cure step at room temperature for making the resulting structure homogeneous. In various approaches, the method as described herein produces a valuable reproduceable material.

In one approach, the pre-cure step may correlate to a first level of homogeneity of the structure, as described herein. In particular, the pre-cure step may form a homogenous material on a large scale, such that millimeter-size pinholes, striping, large poles, etc. do not form in the aerogel material. In one approach, a second level of homogeneity includes a homogeneity of macro-pore morphology as achieved by a curing step at room temperature (RT) that to homogeneity of the structure at a micron (μm) scale. In one approach, the combination of the pre-cure step and the curing step at RT is preferred for commercially viable scale up of RF aerogel.

It is unknown why using the conventional method of gelation (e.g., typically using an initial volume of 100 mL) with an increased volume of initial RF solution results in a non-homogeneous swirl and striping. It was surprising that conditions of large scale synthesis of RF aerogels including a precuring step and gelation at room temperature were necessary to avoid non-homogenous swirl and striping of the gelled RF solution. Furthermore, it became clear that conditions that provide homogeneity for a lab scale investigation are significantly different for large scale production of a similar product. In various approaches described herein, methods include a large scale production of an RF gel where a single synthesis batch produces a homogenous structure throughout the product.

Furthermore, the single synthesis of a homogenous product on a large scale (e.g. greater than 1000 mL of initial RF solution) may be reproduceable over multiple batches. In one approach, 50 batches of bulk resorcinol formaldehyde aerogel have been produced with a defect rate of less than 10%. Moreover, errors causing the defects are detectable and fixable such that errors causing the defects may be remedied to minimize the defect rate to less than 5%.

In addition, the RF solution may be tuned to produce homogenous variations in the pore size of aerogel (e.g., all pores are within a similar size, such as small, medium, large, extra-large, etc.). Without wishing to be bound by any theory, it is surmised that defined modifications of prescribed methods of bulk synthesis may tune a defined range of pore size and defined densities of RF aerogel. In various approaches, sol-gel transition modifiers, may be included in the RF solution for controlling, defining, tuning, etc. pore size and densities of the resulting large scale product. In some approaches, sol-gel modifiers may include one or more salts, surfactants, a combination thereof, etc. Specifically, sol-gel transition modifiers may be an additional component that affects one of the many overlapping phenomena in the sol-gel transition. Without wishing to be limiting in any way, phenomena included in the sol-gel transition include nucleation size, particle growth rate, surface interactions of the particles in solution as the particles grow in size and number, etc. Individual sol-gel transition modifiers may alter at least one of these phenomena thereby altering the resulting structure.

A solid material may be comprised of filaments (e.g., ligaments, etc.). In various approaches, the filaments, ligaments, etc. may be defined as struts that define the pores of the solid material. In various approaches, distinctly different filament, ligament, etc. and pore sizes may be engineered.

The ligaments, filaments, etc. of a material may have different thickness, diameter, length, etc. In one approach, the RF solution may include an additive for tuning a size of a plurality of pores throughout the single bulk aerogel. In one approach, the additive may be a salt for forming larger pores throughout the single bulk aerogel. In one approach, the additive may be a surfactant for forming smaller pores throughout the single bulk aerogel.

In one approach, increasing the concentration of salt in the formulation may increase the average of the largest diameters of the homogenous pores in the RF aerogel. In various approaches, the salt may include NaCl, $MgCl_2$, other water-soluble inorganic salts, or a combination thereof. In various approaches, the concentration of salt may be in a range of about 10 mM to about 500 mM of total formulation. In one approach, the average of the largest diameters of the homogenous pores may be in a range of about 1 μm to about 10 μm. In a preferred approach the average of the largest diameters of the homogenous pores may be about 5 μm.

In one approach, adding an aqueous surfactant to the RF formulation in the large scale synthesis method as described herein may form smaller homogenous pores throughout the RF aerogel. In one approach, the aqueous surfactant may be Sodium Dodecyl Sulphate (SDS), Cetyltrimethylammonium bromide (CTAB), water-soluble surfactants, etc. In one approach, the concentration of surfactant may be in a range of 50 ppm to about 50,000 ppm. In one approach, the average of the largest diameters of the homogenous pores formed in the aerogel having a surfactant added to the formulation may be in a range of about 50 nanometers (nm) to about 500 nm, e.g., nanoscale size. In a preferred approach, an average of the largest diameters of the pores may be about 300 nm.

In one approach, increasing the salt concentration of the RF formulation as well as increasing the temperature during gelation may increase the average of the largest diameters of the homogenous pores of the RF aerogel to greater than 10 μm. In one approach, increasing the gelation temperature to about 45° C. produced much larger homogenous pores of the RF aerogel. The average of the largest diameters of the homogenous pores may be in a range of greater than 10 μm to about 30 μm. In a preferred approach, the average of the largest diameters of the homogenous pores of the RF aerogel formed with increased salt concentration and increased temperature during gelation, approximate 45° C., may be about 20 μm.

In various approaches, the range of tuneability of the pore size, e.g., average of the largest diameters, may involve engineering the solvating conditions of RF colloids and their aggregates during a key phase in the development of the pore structure. Without wishing to be bound by any theory, it is surmised that by increasing the ionic strength of the solution by adding salts, e.g., NaCl, that colloids are less stable (less solvated) and thus aggregate more rapidly at a smaller size. Moreover, the rapid aggregation may produce fewer aggregated structures that become larger and may begin to coalesce into the observed larger structures. In some approaches, increasing the temperature of the high ionic strength systems may amplify the effect as the number of collisions increases, and the energy of collisions increases. In an alternative approach, by adding an aqueous surfactant, colloids are better solvated and can grow larger before aggregation. The effect of added surfactant may result in a larger number of smaller aggregation centers that may coalesce into the solid aerogel matrix. The effect may result in smaller homogenous pores throughout the RF aerogel.

Tuneability of pore size may allow the tailoring of large scale RF aerogel for numerous applications. In some approaches, the tuneability of pore size may provide added benefits due to the intrinsic differences in surface area and tortuosity. For example, without wishing to be limiting in any way, the utilization of larger pore morphology in a flow-through electrode may reduce back pressure from the device. Alternatively, small morphology material with its larger surface area may provide a larger capacity to adsorb ions.

In various approaches, pore morphology of the aerogel may be tailored for defined applications. For example, in one approach, unique drying conditions and post-gel treatments may be essential for a uniform scale-up of resorcinol-formaldehyde aerogel production.

Looking back to FIG. 3, method 300 may continue with step 310 of machining the single bulk aerogel to have at least one defined characteristic. Preferred characteristics of the single bulk aerogel may include a defined size of the aerogel block, a specific shape of the aerogel block, and/or a defined dimension of the aerogel block. Machining processes may include slicing the single bulk aerogel into thin sheets by sawing, CNC milling, etc. In various approaches, to produce useable form factors from RF aerogel blocks, the material may be machinable by common techniques generally understood by one skilled in the art, e.g., such as sawing and CNC milling.

In one approach, the machining of step 310 may include removing a layer on an outer side e.g., top, bottom, side, of the single bulk aerogel. For example, the machining may remove a layer on the bottom, side, and top of the bulk aerogel where the layer is a skin on the formed aerogel. During gelation of the RF solution, in both small scale and large scale processes, particles at the bottom of the aerogel begin to connect and settle thereby forming a nonporous skin on the outside edge of the aerogel. In some applications, it is preferable to remove the nonporous skin of the aerogel for a more homogenous material of the aerogel.

In some approaches, step 310 includes machining the bulk aerogel into individual sheets of aerogel, e.g., aerogel sheets. In one approach, the aerogel sheets may have a thickness in a range of greater than 100 µm to less than 1000 µm. In preferred approaches, the aerogel sheets may have a thickness in a range of about 300 µm to less than 1000 µm.

In various approaches, the large scale synthesis of RF aerogels includes drying, carbonization, and activation of RF aerogel, e.g., aerogel sheets, to accommodate industrial scale production. As described herein, a system of regulating airflow and gas flow around and throughout aerogel sheets, as prepared in step 310, allows efficient and homogenous drying, carbonization and/or activation of the aerogel. In various approaches, the system of regulating airflow and/or gas flow during the subsequent steps of drying, carbonization, and activation allows a third level of homogeneity of the large scale-derived aerogels by tuning the aerogel at the level of micropore homogeneity. For example, the third level of homogeneity may be defined at the level of the area within the micro- and mesopores.

In various approaches to the method 300, porous or nonporous plates may be placed between aerogel sheets to promote airflow and/or gas flow around and throughout the aerogel sheets. In one approach, porous or nonporous plates may be interspersed in the stack of aerogel sheets used to promote drying, carbonization, activation, etc. of the aerogel sheets. In another approach, the porous or nonporous plates may be used as baffles and positioned upstream of a stack of aerogel sheets to regulate and/or direct flow of gas during drying, carbonization, activation, etc. of the aerogel material. In one approach, plates, baffles, etc. may be used to direct and/or deflect airflow to concentrate the airflow over specific portions of a sheet, a stack of sheets, etc.

In various approaches, porous or nonporous plates may be used to create space between each aerogel sheet, e.g., to space the aerogel sheets apart from each adjacent aerogel sheet, during drying, carbonizing, activation, etc. of the aerogel sheets. For example, and not meant to be limiting in any way, plates comprised of nonporous and nonreactive material are interspersed between aerogel sheets to regulate flow of gas throughout the stack of aerogel sheets. In one approach, the plates are comprised of a solid, rigid material for supporting aerogel sheets in a stack.

In another approach, porous or nonporous plates may serve as baffles, positioned between the inflow of gas and a stack of aerogel sheets for disrupting smooth gas flow during the drying, carbonization, and activation of the aerogel sheets. The baffles may create turbulence, mixing, etc. of the gas before the gas interacts with the aerogel.

In various approaches, the porous or nonporous plates may be comprised of materials having different porosity. In one approach, porous plates may be comprised of porous material, e.g., silicon carbide, aluminum oxide, etc. In another approach, the nonporous plates may be comprised of nonporous material, e.g., plastic, ceramic, etc. In one approach, the nonporous plates may be comprised of material that is nonreactive at the elevated temperatures used during carbonization and activation. For example, in some approaches, the nonporous plates may include ceramic material such as aluminum oxide, silicon carbide, etc.

The material of the plates, baffles, etc. used in each step (e.g., drying, carbonization, activation) may be the same or different. For example, and not meant to be limiting in any way, for a process of forming an activated carbonized aerogel, the plates used in the drying step may comprise porous material that is nonreactive at ambient temperatures, and the plates used in the carbonization and activation steps, plates interspersed between the aerogel sheets and/or baffles for regulating gas flow may comprise a nonporous material that is nonreactive at the elevated temperatures (e.g., at temperatures greater than 900° C.). In each step, the plates/baffles may be designed to improve gas flow between the sheets of aerogel for a homogenous material that is dried, carbonized, and/or activated.

In one approach, the bulk block of RF aerogel, following machining where the nonporous skin has been removed and the bottom layer of the block has been removed, the aerogel may be prepared for drying by solvent exchange, e.g., water followed by acetone. In one approach, after solvent exchange of the bulk block aerogel, the aerogel may be further machined into aerogel sheets. In another approach, the bulk block of RF aerogel may be machined into aerogel sheets prior to treating the aerogel material to solvent exchange.

Acetone is fully miscible with water but has lower surface tension and thus may be more easily evaporated from the pores without damaging the pore structure. In one approach, drying of the aerogel may include a solvent exchange with acetone. In one approach, the acetone-filled organic aerogel sheets are preferably dried slowly to minimize the impact of surface tension and evaporative forces, conserving the porosity of the material.

Step 312 includes drying the machined aerogel. In one approach, the drying may include drying a single bulk aerogel. In another approach, the drying may include drying the aerogel sheets machined from the single bulk aerogel. In one approach, the drying may be at the second temperature under an air flow.

Figure 4B:
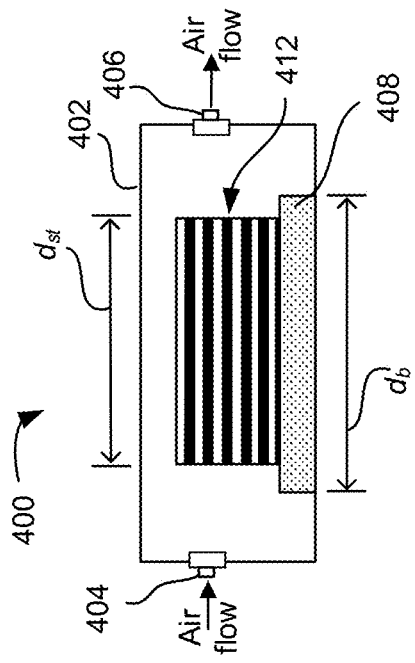
FIG. 4B is a side view of a schematic drawing of an apparatus, according to one embodiment.
Figure 4C:
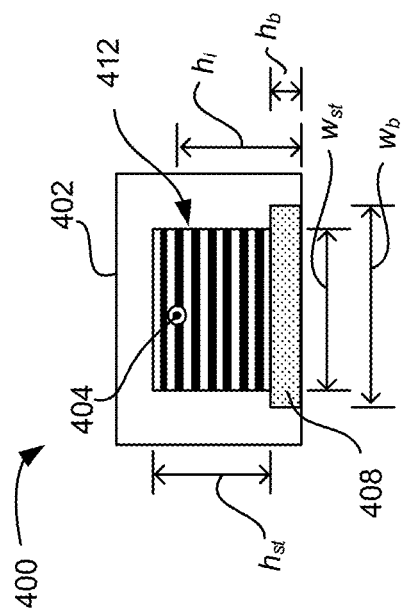
FIG. 4C is a front view of a schematic drawing of an apparatus, according to one embodiment.
Figure 4A:
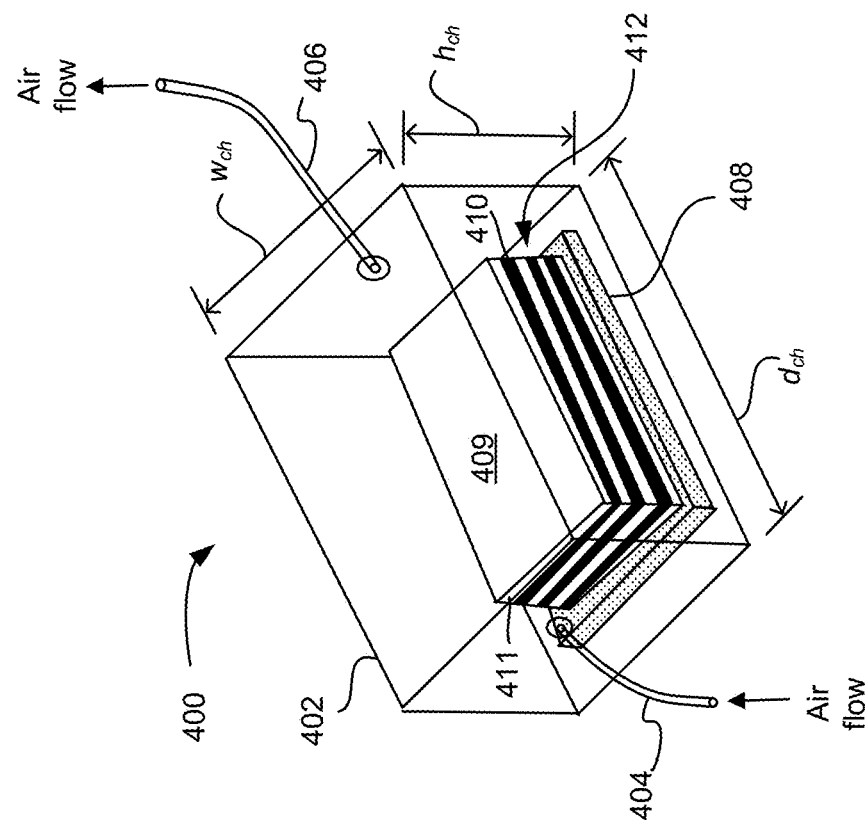
FIG. 4A is a perspective view of a schematic drawing of an apparatus, according to one embodiment.

In some approaches, step 312 may include drying wet aerogel sheets in a drying chamber having an airflow control unit and bubbler. FIGS. 4A-4C depict schematic drawings of a device 400 for drying large scale RF aerogels, in accordance with one aspect of an inventive concept. As an option, the present device 400 may be implemented in conjunction with features from any other inventive concept listed herein, such as those described with reference to the other FIGS. Of course, however, such device 400 and others presented herein may be used in various applications and/or in permutations which may or may not be specifically described in the illustrative embodiments listed herein. Further, the device 400 presented herein may be used in any desired environment.

In one approach, the device 400 is a chamber for drying large scale RF aerogels. FIG. 4A is a perspective view, e.g., isometric view, of the device 400. The device 400 includes a chamber 402 that may be a sealed box. The device 400 includes an inlet tube 404 for airflow and an outlet tube 406 for airflow. The device 400 may include a base 408 positioned under a stack 412 of aerogel sheets 410. In various approaches, the base 408 may be a support, platform, substrate, etc. The stack 412 may include wet aerogel sheets 410 sandwiched between plates 411. In some approaches, the plates 411 may be comprised of a nonreactive porous material 409 such as silicon carbide, aluminum oxide, etc. In other approaches, the plates may include a nonporous material, such as plastic, ceramic, etc. In one approach, a plate may be used as a baffle, and positioned upstream of the aerogel material, e.g., between the inlet tube 404 and the stack 412 of aerogel sheets 410, to regulate airflow during drying.

In one approach, a stacking pattern of the stack may include each aerogel sheet 410 sandwiched between two plates 411 in the stack 412. In another approach, a stacking pattern of the stack may include more than one aerogel sheet 410 sandwiched between two plates 411 in the stack 412.

The chamber 402 may have dimensions, height $h_{ch}$, width $w_{ch}$, and depth $d_{ch}$, larger than the stack 412 of aerogel sheets 410 to be dried. In preferred approaches, the stack 412 is positioned inside the chamber 402, and the chamber 402 is sealed. FIG. 4B is a side view of the device 400. As shown in FIG. 4B, the depth of the base $d_b$ may be larger than the depth of the stack $d_{st}$. In some approaches, the depth of the stack $d_{st}$ has a measurement that is a fraction of the measurement of the depth of the chamber $d_{ch}$ (as shown in FIG. 4A).

FIG. 4C is a front view of the device 400. As shown, the front view of the device 400 shows the inlet entry of the inlet tube 404 of the chamber 402. In one approach, the height of the chamber $h_{ch}$ is greater than the height of the stack $h_{st}$ plus the base 408 to allow air flow across and around the stack. In one approach, the height of the stack $h_{st}$ is less than the height of the chamber $h_{ch}$ by at least one inch (see FIG. 4A for height of the chamber $h_{ch}$). In one approach, the height of the inlet $h_i$ of the inlet tube 404 is approximately at least three-quarters of the height of the chamber $h_{ch}$. In one approach, the height of the base $h_b$ may be a height to allow appropriate airflow around the stack 412. In one approach, the height of the base $h_b$ may be approximately one inch, or higher or lower.

As shown in FIG. 4C, the width of the stack $w_{st}$ may be the width of the base $w_b$, or less. In some approaches, the width of the stack $w_{st}$ and width of the base $w_b$ are less than the width of the chamber $w_{ch}$.

In one approach, two drying chambers with inlet tubes of air flow may be connected and share a similar air flow controller. In another approach, drying chambers may have their own independent air flow controller. In one approach, baffles may be positioned upstream of the aerogel stack to regulate air flow.

In one approach, the drying chamber may be preconditioned with acetone to create a vapor saturated atmosphere to further slow the rate of evaporation in the initial stage of drying. After being loaded with a wet aerogel stack, the box may be sealed. The air flow rate may be set to an inflow rate of about 5 to about 300 mL/min until dry. In one approach, 15 aerogel sheets may be dried in the chamber for a time duration of about 3 to 6 days at an inflow air rate of 80 mL/min. In one approach, the linear shrinkage of the aerogel sheets upon drying may be in a range of less than 5% of the original length of the wet aerogel sheets. Drying the aerogel at an ambient temperature as described herein may be preferable for a cost effective industrial scalable process as other methods of drying, i.e. supercritical extraction, are cost prohibitive.

In preferred approaches, the drying of the aerogel of step 312 occurs slowly at an ambient temperature, e.g., room temperature, in order to retain the integrity of the pore structure, microstructure, original dimensions, etc. of the material. In one approach, the drying of the aerogel of step 312 may include an ambient pressure. In one approach, the drying of the aerogel of step 312 may include a pressure for effective drying of the aerogel at a temperature for retaining the integrity of the pore structure. In approaches in which the aerogel may be placed in an oven for a heated drying process, the pores may collapse.

Looking back to FIG. 3, method 300 may continue with step 314 includes heating the dried single bulk aerogel at a third temperature in an inert gas for carbonizing the single bulk aerogel. In various approaches, the carbonization process of step 314 may include placing the dried aerogel into a furnace, e.g., a box furnace, a quartz tube placed inside an electric clamshell furnace, etc. to pyrolyze the polymer of the aerogel thereby resulting in a carbon aerogel. Conditions of the carbonization step 314 would include conditions (e.g., temperature, gas flow, time duration, etc.) as generally understood by one skilled in the art.

In one approach, dried aerogel sheets may be carbonized by a modified method for large sheets of aerogel, e.g., having lengths greater than 10 cm. In a similar stacking pattern as followed in step 312 in the drying of the aerogel, in step 314 the dried aerogel sheets may be stacked between plates (e.g., porous or nonporous plates, etc.). In one approach, the plates may be porous ceramic, other nonreactive solid, etc. In one approach, the plates may include a nonporous material that is nonreactive with the aerogel material at temperatures used for carbonization, e.g., at temperatures above 900° C. In preferred approaches, the nonporous material of the plates using in carbonization include silicon carbide, aluminum oxide, etc.

The thickness of the plates may be in a range of at least 1 mm to about 10 mm. In one approach, no more than two sheets of dried aerogel may be stacked between plates. In one approach, the thickness of the dried aerogel sheets may be in range of 50 μm to about 10 mm.

The stack of aerogel and porous or nonporous plates may be placed in a furnace with flowing inert gas (e.g., nitrogen ($N_2$), argon, etc.) and heated to temperature appropriate for carbonization. In one approach, a temperature for carbonization may be in a range of about 600° C. to about 1300° C. Preferably, in one approach, a temperature for carbonization in the described system may be at least 950° C. for at least 3 hours (hrs). Carbonization of the large scale RF aerogels may result in a loss of about 50% mass from the mass of the RF aerogel prior to carbonization but may be higher or lower. In one approach, carbonization of the large scale RF aerogel may result in a loss of about 25% mass from the RF aerogel prior to carbonization.

In one approach, the stack formation for carbonizing the aerogel sheets may use a stack 412 as used in the device 400 for drying the aerogel sheets (see FIGS. 4A-4C). For example, the plates positioned between the dried aerogel sheets as described in step 314 for carbonizing the aerogel material may be similar to the plates 411 in the drying stack 412 of FIGS. 4A-4C. In a preferred approach, the plates include a material that is optimized for drying, carbonizing, and activating, (e.g., the material is nonreactive with the aerogel material at an ambient temperature for drying and high temperatures needed for carbonization and activation), so that the aerogel sheets may remain in one stack interspersed between the plates throughout the drying, carbonizing, and activating steps. In one approach of the carbonizing step 314, the plates may include a porous material. In another approach of the carbonizing step 314, the plates may include a nonporous material.

In one approach, a plate may be used as a baffle during the carbonization of the aerogel sheets in step 314. The baffle may be positioned in the furnace upstream of the aerogel stack between the inlet of the flowing inert gas and the aerogel stack to regulate the flow of the inert gas.

Step 316 of method 300 includes activating the carbonized single bulk aerogel. In one approach, activating the carbonized bulk aerogel is for etching the pores of the carbonized aerogel for more efficient adsorption of salt ions from fluid added to the activated carbonized aerogel. In one approach, step 316 includes activating the carbonized aerogel at a fourth temperature in a carbon dioxide flow by varying the pressure according to a predefined pattern to create activation in the carbonized single bulk aerogel. In one approach, the activating the carbonized bulk aerogel occurs in a furnace.

The activation process of the carbonized aerogel material involves atoms of the structure being chemically etched away within the pores (i.e., activation of the structure via the Boudouard reaction) preferably in a homogeneous manner throughout the material. As described herein, a system for activation of the carbonized aerogel material includes a similar stacking pattern as followed in step 312 in the drying of the aerogel, as illustrated for device 400 in FIGS. 4A-4C. A similar stack may be employed for carbonization of the aerogel in step 314 where, in the case of activation, dried aerogel sheets are placed between porous plates during the carbonization process. Further, activation of the carbonized aerogel sheets as described in step 316 may include stacking the carbonized aerogel sheets between plates of preferably porous ceramic material to regulate and/or direct gas flow through the carbonized aerogel material for etching out regions of less bound carbon in the pores of the carbon aerogel.

In one approach, activation of the carbonized RF aerogels includes heating the carbonized RF aerogels to temperature effective for activation of the carbonized RF aerogels. In various approaches, activation of the carbonized RF aerogels occurs in a furnace. In one approach, a temperature for activation may be in a range of about 900° C. to about 1300° C. In a preferred approach, a temperature for activation is in a range of about 910° C. to about 950° C.

Moreover, the activation process occurs in a furnace under a gas flow of pure $CO_2$, a mixture of $CO_2$ and inert gas (e.g., $N_2$, argon, etc.), etc. a pressure in a range of 200 to about 700 Torr for a duration of about 1 to 6 hours. In one approach, the varying of the pressure may include cycling the pressure between 200 and 700 Torr during the activation step. In one approach, the activation step may include cycling between $CO_2$ and then to $N_2$ and then back to $CO_2$, etc. The gas inlet may be switched back to inert gas (e.g., $N_2$, argon, etc.) and the activated carbonized aerogels cooled to room temperature.

In one approach of step 316, the activation may include a gas mixer/baffles placed upstream of the aerogel material in order to regulate the gas for a homogenous activation of the aerogel material. Preferably, as described herein, the activation process includes a gas mixer and/or baffles positioned in the furnace and positioned upstream of the aerogel stack to allow gas mixing of the incoming gas to adjust to the furnace temperature before reaching the aerogel stack. Thus, the incoming gas may be mixed with gas present in the furnace and brought to furnace temperature before exposure to the aerogel stack in order to promote a homogenous activation throughout the aerogel material. For example, as described herein, the activation process including a gas mixer/baffle allows the extent of activation by etching for each aerogel sheet in the stack to be preferably homogenous throughout the sheet and throughout the stack of sheets of aerogel.

In sharp contrast, in processes without a gas mixer/baffle, gas mixing and heating may not occur simultaneously. For example, the incoming gas is introduced to the aerogel at a colder temperature and then heats to the desired temperature during exposure to the aerogel material, thereby introducing concentrated regions of activation (e.g., toward the bottom, at the edge, etc.) of the aerogel.

Scaling up the synthesis of RF solution for formation of organic aerogels has not been predictable. In various approaches, larger volume of RF solution (greater than 100 mL) induces unforeseen and surprising effects occur that drastically change the resulting material.

According to one embodiment, a large scale synthesis of RF aerogel having a uniform structure is described. Further, the bulk aerogel may be pyrolyzed and activated to produce bulk carbon aerogel or bulk activated carbon aerogel, both exhibiting a uniform microstructure. In some approaches, the microstructure of the aerogel structure is defined as the pore structure throughout the material.

For synthesis of large-scale batches of carbonized aerogel (e.g., greater than 100 mL of starting solution), it may be critical for reproduceable activation of the bulk carbon aerogel to perform the activation of the multiple carbon aerogel sheets of a single bulk aerogel in one activation step at the same time. In one approach, uniform activation of all slices of aerogel within the stack may be achieved by allowing the contacting $CO_2$ to be heated and dispersed uniformly throughout the stack. In one approach, a layer of a porous nonreactive material, a baffle, may be positioned proximate to the carbonized single bulk aerogel during the activating. In one approach, the activation may be uniform across the entire carbonized single bulk aerogel. For the purposes of this disclosure, uniform may be defined as having a relative error less than 5% throughout the homogenous carbonized aerogel, as determined by activation mass loss and may be further correlated to specific surface area In one approach, a nonreactive porous material, e.g., a baffle, may be positioned in the gas flow path, upstream of the aerogel stack, yet still within the heated zone of the furnace. In one approach, the porous material of the baffle may slow the incoming gas and may facilitate a heat transfer between the nonreactive porous material (e.g., baffle) and gas. For example, and not meant to be limiting in any way, carbon aerogel treated with a baffle during activation may allow variation of activation time to achieve a range in an extent of activation, and thus as a result, a range of surface area, micropore sizes, etc.

As detailed below in Table 1, it is generally understood by one skilled in the art that activation time and temperature are related to the extent of activation. For small, laboratory scale synthesis of RF aerogels, the uniformity of activation of the aerogel may not be substantially affected by activation time and temperature.

In one approach, activation time and temperature may be used to tailor the micropores for selectivity of ions, for example, for an activated carbon aerogel as described herein that may be utilized as electrode material for a capacitive deionization cell.

EXPERIMENTS

For a typical procedure, resorcinol (430.5 grams (g), 3.92 mol) was dissolved in distilled water (525 g, 29.14 mol). Next, 37% formaldehyde solution (626.5 g, 7.84 mol) was added, followed by glacial acetic acid (15.4 g, 0.245 mol). The reagents were mixed until fully dissolved before proceeding to a pre-cure step and finally the solution was poured into a mold. This mixing procedure created approximately 1.5 L of resorcinol-formaldehyde solution; however, procedure may be scaled proportionally to produce desired material volume.

The method was used to form two different mold constructions, and to compare the results produced with a thermal pre-cure, as shown in FIGS. 5A and 5B. Specifically, the pre-cure for the aerogel of FIG. 5A included the following: a RF precursor solution was heated with stirring to achieve a mixed liquid temperature of 40-50° C., this temperature was held for no less than 30 mins, and up to 6 hours. The precursor solution was then allowed to cool to room temperature. Once cool, the solution was cast into a PTFE block mold and allowed to gel at room temperature over 2-5 days, the block then underwent a final post-gel bake at 70° C. for 1-2 days to achieve full cure and physical properties.

The RF solution was pre-cured at 30-45° C. for no less than 4 hours followed by gelation at room temperature between glass panes produced aerogel sheets largely devoid of pin-holes and exhibited largely homogenous structure throughout the block, as shown in FIG. 5A.

In sharp contrast, the image of FIG. 5B shows the formation of a bulk aerogel structure without a pre-cure step and gelation of the large volume RF solution following conventional gelation methods at 70° C. The aerogel block formed bubbles, internal voids, and had a largely nonhomogeneous structure.

Figures 6A, 6B:
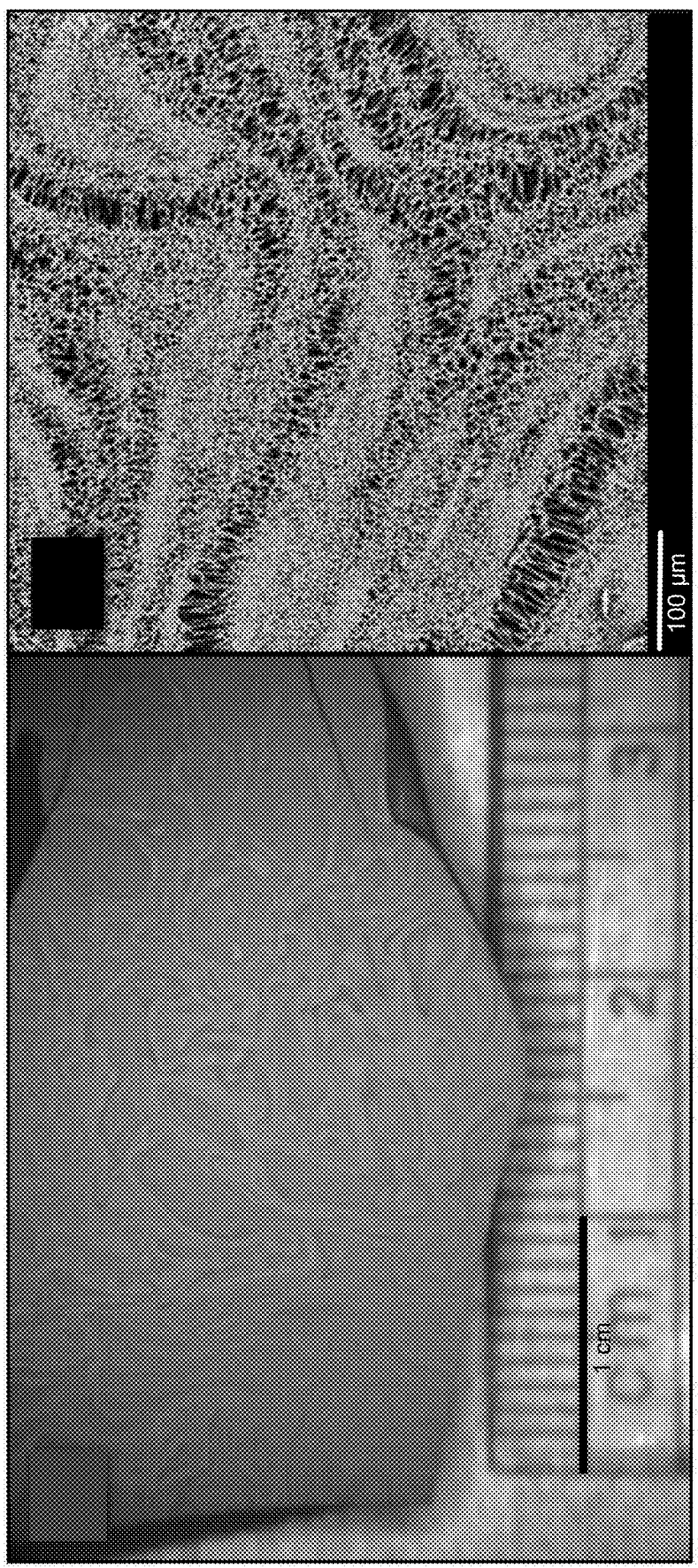
FIG. 6A is an image of a pre-cured block cured at 70° C. exhibiting a non-homogenous swirl pattern, according to one embodiment.
FIG. 6B is a scanning electron microscopy image of a pre-cured block cured at 70° C. exhibiting a non-homogenous pattern, according to one embodiment.

The images of FIGS. 6A and 6B show the effect of an elevated gelation temperatures on a pre-cured aerogel. To contrast, and to elucidate the importance of gelation temperature, gelation of a pre-cured solution following the above method, followed by gelation at an elevated temperature of 70° C., resulted in a nonhomogeneous bulk material as in part FIG. 6A. The image shows a nonhomogeneous swirl pattern in the aerogel block formed with an elevated temperature during gelation. A scanning electron microscope image of the same material is shown in FIG. 6B.

Tuning Pore/Filament Size of RF Aerogel

Bulk aerogels were synthesized with four distinctly different pore/filament sizes as shown in FIGS. 7A-7D. FIG. 7A is a scanning electron microscopy (SEM) image of a carbonized RF aerogel formed by the large scale synthesis methods as described herein. As shown, the synthesis method that included RF solution without additive produced homogeneous medium-size pores. As annotated, the average of the largest diameter $d_M$ of the majority of the medium-sized pores was approximately 1 µm in diameter.

FIG. 7B is an SEM image of an aerogel having larger pores distributed homogenously throughout the aerogel. The aerogel having larger pores was formed by a modification of the RF aerogel synthesis method using an RF solution without additive as shown in FIG. 7A. The modification included adding 31.6 g NaCl (372 mM NaCl total) during formulation to produce homogeneous large-size pores, as shown in the SEM image of FIG. 7B. As annotated, the average of the largest diameter ch of the majority of the large-sized pores was approximately 5 µm in diameter.

FIG. 7C is an SEM image of an aerogel having smaller pores distributed homogenously throughout the aerogel. The aerogel having smaller pores was formed by a modification of the RF aerogel synthesis method using an RF solution without additive as shown in FIG. 7A. The modification included adding 16.5 g of Sodium Dodecyl Sulfate, or other aqueous surfactant, to produce homogeneous small-size pores, as shown in the SEM image of FIG. 7C. As annotated, the average of the largest diameter ds of the majority of the small-sized pores was less than 500 nm in diameter.

FIG. 7D is an SEM image of an aerogel having extra-large pores distributed homogenously throughout the aerogel. The aerogel was formed by a modification of the RF aerogel synthesis method using an RF solution without additive as shown in FIG. 7A. The modification included adding 31.6 g NaCl (372 mM NaCl total) during formulation, followed by an elevated gelation temperature of 45° C., to produce homogenous extra-large size pores, as shown in SEM image of FIG. 7D. The elevated temperature during gelation generated a remarkable change in pore size as indicated by the medium-size pores of the aerogel formed the same added salt concentration and gelation at room temperature (as shown in FIG. 7B) compared to the extra-large-size pores formed in the aerogel having a similar added salt concentration with gelation at elevated temperature (as shown in FIG. 7D). As annotated, the average of the largest diameter $d_U$ of the majority of the extra-large-size pores was about 20 µm in diameter.

Machining RF Aerogel Blocks

In one application, thin sheets in the range of 300-1000 µm were produced by slicing from a larger block using a bandsaw equipped with a gate and manual guides. In various approaches, RF aerogel blocks and thin sheets formed by methods described herein exhibited a nonporous skin layer that ranges in thickness from about 10 µm to about 100 µm. The nonporous skin layer did not demonstrate the same structure as the bulk material; thus, the nonporous skin layer was removed to produce homogeneous pieces of RF aerogel. Thin skin layers were removed with light sanding and laser rasting/ablation. Thick skin layers were more efficiently removed by simply slicing off the skin from the RF aerogel.

Moreover, in addition to the nonporous skin layer, for large blocks the extended layer of the bottom surface may cause internal stress of the material. In some cases, the layer having a thickness of about 1 mm to about 5 mm was removed from the block during slicing to prevent cracks during post processing, specifically during activation. The internal stress pattern caused by the bottom layer is not well characterized, however the effects caused by the presence of the bottom layer can be mitigated by slicing thin sheets parallel to the bottom surface of the block.

Drying, Carbonization, and Activate of RF Aerogels

The following process was followed for producing thin sheets (e.g., 300-1000 μm) sliced from a bulk block and may be applicable to a large range of other form factors. After machining the bulk block, wet organic aerogel sheets were washed with deionized (DI) water (3 times, 18 hrs each) to remove any residual catalyst and starting reagents. The water was exchanged for acetone (3 times, 18 hrs each). The acetone-filled organic aerogel sheets were dried slowly to minimize the impact of surface tension and evaporative forces, conserving the porosity of the material.

Wet aerogel sheets were sandwiched between porous plastic or ceramic plates and then loaded into a custom-made drying chamber equipped with an airflow control unit and bubbler, see FIGS. 4A-4C. The drying chamber was preconditioned with acetone to create a vapor saturated atmosphere to further slow the rate of evaporation in the initial stage of drying. After being loaded with a wet aerogel stack, the box was sealed, and the air flow rate was set to 50-300 mL/min until dry. Drying 15 sheets in a typical stack took about 3 to 6 days at 80 mL/min. The linear shrinkage upon drying was <5%.

For carbonization, dry RF aerogel sheets were stacked between plates made from porous ceramic. More specifically, a stack consisted of two sheets of aerogel with a thickness of approximately 500 μm, sandwiched between two plates of porous silicon carbide with a thickness of 6 mm. This sandwich was repeated until the total stack had a height of 15 cm. The stack was placed into a 6" diameter quartz tube furnace with flowing nitrogen gas ($N_2$) and heated to 950° C. at a heating rate of 4° C./min. The temperature was held at 950° C. for 3 hrs. The stack was allowed to cool to room temperature, under a continuous 5 mL/min $N_2$ flow. The stack was exposed to air in the absence of $N_2$ before activation. This sequence resulted in a uniform mass loss of 50%±2% for all aerogel slices.

For activation, the furnace was resealed, and inert atmosphere was reestablished. The furnace was heated to 950° C. at a heating rate of 4° C./min. Once at temperature, the gas inlet was switched to pure $CO_2$ at a flow rate of 2 mL/min and the pressure was cycled between 200 to 700 Torr using a solenoid equipped vacuum pump. The $CO_2$ flow/pressure cycling was continued for 1 to 2 hours, then the gas inlet is switched back to $N_2$ and the furnace was allowed to cool to room temperature.

As shown in Table 1 below, using a full baffle, which extends across the entire cross-section of the gas flow path, the aerogel/carbide stack reduced variability of the extent of activation (±% loss) compared to no baffle or using a partial or ½ baffle (e.g., having a baffle that extends only part of the way through the cross-section of the gas flow path) with the aerogel/carbide stack during activation. The Extent of Activation has a variability of ±10% for conditions where no baffle was present, and ±5% for conditions with a partial or ½ baffle present. In preferred approaches, the range of variability of activation was between ±2% to 3% for conditions having a full baffle.

In Use

Various aspects of an inventive concept described herein may be developed for the commercially viable scale production of homogeneous resorcinol-formaldehyde aerogel. As described herein, various embodiments are valuable in the processing of an organic aerogel into carbon aerogel and uniformly activated carbon aerogel. The materials described herein may be used as carbon electrodes for application in capacitors, electron transfer devices such as in capacitive deionization, etc. Additionally, the material as produced following method described herein has potential application as organic foams for adsorbents, thermal, acoustic insulation, etc.

In some approaches, the tunable characteristic of varying activation time and temperature during synthesis of large scale RT carbonized aerogels may lend itself toward

TABLE 1

Effect of Baffles on Activation of Carbonized RT Aerogels

| Sample | Activation conditions | Total mass before Activation (g) | Extent of Activation (% mass loss) |
|---|---|---|---|
| Aerogel/carbide stack, No baffle | 2 L/min, 950° C., 1 hr | 51.0 | 21 ± 10% |
| Aerogel/carbide stack with ½ baffle | 2 L/min, 950° C., 1 hr | 44.0 | 17 ± 5% |
| Aerogel/carbide stack with full baffle | 2 L/min, 950° C., 1 hr | 55.0 | 14 ± 3% |
| Aerogel/carbide stack with full baffle | 2 L/min, 950° C., 1.5 hr | 46.3 | 20 ± 2% |
| Aerogel/carbide stack with full baffle | 3 L/min, 950° C., 1.5 hr | 45.4 | 26 ± 3% | tailoring the material for various applications from fertilizer recapture to heavy metal removal, and therefore a broad range of commercial interest.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concept have been described above, it should be understood that they have been presented by way of example only, and not limitation. Thus, the breadth and scope of an aspect of an inventive concept of the present invention should not be limited by any of the above-described exemplary aspects of an inventive concept but should be defined only in accordance with the following claims and their equivalents.

What is claimed is:

1. A method of forming a single bulk aerogel having a linear dimension greater than 10 millimeters and having a homogenous distribution of pores throughout, the method comprising:
   mixing a solution comprising resorcinol and formaldehyde, wherein the solution has a volume greater than 100 milliliters;
   heating the solution to a first temperature for a first defined duration of time;

cooling the solution to a second temperature lower than the first temperature; and curing the solution for gelation of the solution,
wherein the curing occurs at about the second temperature for a second defined duration of time.

2. The method as recited in claim 1, wherein the first temperature is in a range of about 40° C. to about 60° C.

3. The method as recited in claim 1, wherein the first defined duration of time is in a range of greater than 30 minutes to about 6 hours.

4. The method as recited in claim 1, wherein the volume is greater than 500 milliliters.

5. The method as recited in claim 1, wherein the solution comprises an additive for tuning a size of a plurality of pores throughout the single bulk aerogel.

6. The method as recited in claim 5, wherein the additive is selected from the group consisting of: a salt and a surfactant.

7. The method as recited in claim 1, wherein the curing includes casting the solution into a pre-form having at least one dimension greater than 10 millimeters, wherein the pre-form is selected from the group consisting of: a mold and a template.

8. The method as recited in claim 1, wherein the second defined duration of time is in a range of greater than 24 hours to about 5 days.

9. The method as recited in claim 1, further comprising, machining the single bulk aerogel to have at least one defined characteristic selected from the group consisting of: a size, a shape, and a dimension.

10. The method as recited in claim 9, wherein the machining includes removing a layer on an outer side of the single bulk aerogel.

11. The method as recited in claim 9, further comprising, drying the machined single bulk aerogel.

12. The method as recited in claim 11, wherein the drying is at the second temperature under an air flow.

13. The method as recited in claim 11, further comprising, heating the dried single bulk aerogel at a third temperature in an inert gas for carbonizing the single bulk aerogel.

14. The method as recited in claim 13, further comprising, activating the carbonized single bulk aerogel at a fourth temperature in a carbon dioxide flow by varying a pressure according to a predefined pattern to create activation in the carbonized single bulk aerogel.

15. The method as recited in claim 14, wherein a layer of a porous material is proximate to the carbonized single bulk aerogel during the activation of the carbonized single bulk aerogel,
wherein the activation is uniform across the entire carbonized single bulk aerogel.

* * * * *